(12) United States Patent
Nordberg et al.

(10) Patent No.: US 8,652,410 B2
(45) Date of Patent: Feb. 18, 2014

(54) CONTROL METHOD AND ARRANGEMENT FOR SELECTIVE CATALYTIC REDUCTION

(75) Inventors: Daniel Nordberg, Vasa (FI); Raine Peltokoski, Vaasa (FI)

(73) Assignee: Wartsila Finland Oy, Vaasa (FI)

( * ) Notice: Subject to any disclaimer, the term of this patent is extended or adjusted under 35 U.S.C. 154(b) by 0 days.

(21) Appl. No.: 13/807,700

(22) PCT Filed: May 20, 2011

(86) PCT No.: PCT/FI2011/050460
§ 371 (c)(1),
(2), (4) Date: Dec. 28, 2012

(87) PCT Pub. No.: WO2012/001222
PCT Pub. Date: Jan. 5, 2012

(65) Prior Publication Data
US 2013/0115152 A1    May 9, 2013

(30) Foreign Application Priority Data
Jun. 29, 2010  (FI) .................................. 20105744

(51) Int. Cl.
*B01D 53/94*   (2006.01)
*F01N 3/18*    (2006.01)
*F01N 3/20*    (2006.01)
*G05D 7/00*    (2006.01)

(52) U.S. Cl.
USPC ........... 422/105; 422/108; 422/111; 422/168; 422/177; 422/180; 700/266; 700/271; 423/212; 423/213.2; 423/239.1; 60/272; 60/274; 60/299; 60/301

(58) Field of Classification Search
USPC ............ 423/212, 213.2, 239.1; 422/105, 108, 422/111, 168, 177, 180; 60/272, 274, 299, 60/301; 700/266, 271
See application file for complete search history.

(56) References Cited

U.S. PATENT DOCUMENTS

| | | | |
|---|---|---|---|
| 6,295,809 B1 * | 10/2001 | Hammerle et al. | ............ 60/286 |
| 6,399,034 B1 * | 6/2002 | Weisweiler | ............... 423/213.2 |
| 2010/0024393 A1 | 2/2010 | Chi et al. | |
| 2010/0028230 A1 | 2/2010 | Gady et al. | |
| 2010/0122520 A1 | 5/2010 | Han | |
| 2010/0154386 A1 | 6/2010 | Perrin et al. | |

FOREIGN PATENT DOCUMENTS

| | | | |
|---|---|---|---|
| DE | 10 2009 036 394 A1 | 5/2010 | |
| JP | 6-335 A * | 1/1994 | ............ B01D 53/36 |
| WO | WO 2008/043928 A1 | 4/2008 | |
| WO | WO 2010/065963 A2 | 6/2010 | |
| WO | WO 2010/065965 A2 | 6/2010 | |

* cited by examiner

*Primary Examiner* — Timothy Vanoy
(74) *Attorney, Agent, or Firm* — Muncy, Geissler, Olds & Lowe PLLC

(57) ABSTRACT

A method for controlling a selective catalytic reduction system (SCR) exploiting a set of predetermined trigger events and a set point for the NOx concentration, and an arrangement for SCR. At the occurrence of a trigger event, NOx concentration measurement downstream from the catalyst elements is started and the difference between the measured concentration and the set point is determined. If the difference is negative, the dosing of the reducing agent is decreased. If the difference is positive, the dosing of the reducing agent is increased and after system stabilization a new measurement is started. If the measured value is below the previous measured value, the same dosing is maintained. If the measured value is above the previous measured value, the dosing is decreased with an amount greater than the increase after the previous measurement.

11 Claims, 3 Drawing Sheets

CONTROL METHOD AND ARRANGEMENT FOR SELECTIVE CATALYTIC REDUCTION

TECHNICAL FIELD OF THE INVENTION

The present invention relates to a method for controlling a selective catalytic reduction system in accordance with claim 1, and to an arrangement for selective catalytic reduction in accordance with the preamble of claim 7.

BACKGROUND OF THE INVENTION

Due to continuously tightening regulations concerning nitrogen oxide (NOx) emissions of internal combustion engines in ships and power plants, selective catalytic reduction (SCR) systems are becoming more and more common. With the SCR, NOx reductions of up to 90% or even greater can be achieved.

In an SCR system a catalyst material and a reducing agent are used to decompose the NOx formed during the combustion back to the basic elements. The catalyst is arranged on the surface of a supporting ceramic material forming a honeycomb structure inside a reactor. On the surface of the catalyst, the NOx reacts with ammonia that is used as the reducing agent and nitrogen and water is formed. In practice, urea is often used instead of ammonia for safety reasons. This applies especially to the marine applications, where leaking ammonia is a serious hazard. Urea is injected into the exhaust gas flow in a water solution. Due to the high temperature of the exhaust gas, water evaporates and the urea molecules break up into ammonia and carbon dioxide.

Correct dosing of the reducing agent is important for several reasons. If the amount of the reducing agent that is injected into the exhaust system is too small, NOx reduction is not as effective as it could be. On the other hand, excessive dosing of the reducing agent results in ammonia slip, which means that part of the ammonia flows through the SCR system without reacting with the NOx. Ammonia emissions are even more harmful than the NOx emissions, and therefore overdosing of the reducing agent is an undesired situation. If the exhaust system is provided with an oxidation catalyst that is placed down-stream from the SCR elements, at least part of the excess ammonia is oxidized. However, this is not an optimal solution for the reduction of ammonia slip, since NOx is formed in the oxidation process. If the dosing of the reducing agent can be optimized, also the size of the reducing agent tank can be minimized.

To achieve accurate dosing of the reducing agent, an SCR system can be equipped with a NOx sensor that measures the NOx concentration downstream from the SCR elements. Patent application WO 2008043928 A1 discloses an SCR system of a vehicle where a NOx sensor is placed downstream from an SCR catalyst and the NOx and ammonia concentration of the exhaust gas is continuously monitored. According to the method, an initial amount of urea is injected into the exhaust system. If the engine is running at steady state, the urea dosing is increased by multiplying the initial amount by a coefficient greater than one. After increasing the dosing, NOx and ammonia concentration is measured, and if the measurement shows decreased concentration, the dosing is increased again. This step is repeated until the concentration starts to increase. This is an indication of overdosing, and urea dosing is therefore decreased by multiplying the previous amount by a coefficient smaller than 1. This step is repeated as long as the concentration reduces. When the concentration starts to increase again, the urea dosing is increased.

A problem with the control method presented above is that it is not suitable for large internal combustion engines. In large internal combustion engines, such as in the engines used in ships and powerplants, the stabilization of the SCR system takes a relatively long time after the dosing of the reducing agent is changed, and therefore a method comprising several iteration steps is too slow. A problem related to continuous NOx measurement is that the lifetime of a sensor that is continuously exposed to the exhaust gases is very limited.

SUMMARY OF THE INVENTION

The object of the present invention is to provide an improved method for controlling selective catalytic reduction and an arrangement for selective catalytic reduction. The characterizing features of a method according to the present invention are given in claim 1 and the characterizing features of a system according to the present invention are given in the characterizing part of claim 7.

According to the present invention, a method for controlling a selective catalytic reduction system, the catalytic reduction system being for an internal combustion engine, exploits a predetermined set of trigger events and a predetermined set point for NOx concentration downstream from a catalyst element. The system waits for a trigger event, and at the occurrence of a trigger event, NOx concentration measurement downstream from the catalyst elements is started and the difference between the measured concentration and the set point is determined. If the difference is negative, the dosing of the reducing agent is decreased with an amount dependent on the difference and a new trigger event is waited for. If the difference is positive, the dosing of the reducing agent is increased with an amount dependent on the difference and a predetermined amount of time is waited for the stabilization of the system. A new NOx concentration measurement is started and the NOx concentration is compared to the result of the previous measurement. If the measured value is below the previous measured value, the same dosing of the reducing agent is maintained, and a new trigger event is waited for. If the measured value is above the previous measured value, the dosing of the reducing agent is decreased with an amount greater than the increase after the previous measurement, and a new trigger event is waited for.

The NOx measurement system is activated only when it is expected that the NOx emissions have changed for some reason. This enables protection of the NOx measurement means between the measurements. The control method is also effective, since only one or two measurements and adjustments of the dosing of the reducing agent are needed after a trigger event is detected.

According to an embodiment of the present invention, the NOx concentration is measured from a by-pass duct. Clean gas can be introduced into the by-pass duct between the measurements. This is a simple but effective way of protecting the NOx measurement means.

According to another embodiment of the invention, the NOx concentration is measured downstream from an oxidation catalyst. Also in this case, the measurement can take place in a by-pass duct.

The trigger events can include changes in at least one of the following parameters:
  waste gate position,
  ambient temperature,
  ambient humidity,
  charge air temperature,
  charge air pressure,
  engine load, engine speed,
charge air cooling water temperature,
fuel injection timing,
fuel injection duration,
ignition timing.

Elapse of a predetermined amount of time from the previous measurement or starting of the engine can also be trigger events.

According to the present invention, an arrangement for selective catalytic reduction comprises at least one catalyst element, means for introducing reducing agent into the exhaust system upstream from the catalyst element, control means for controlling the dosing of the reducing agent and means for measuring NOx concentration downstream from the catalyst element. The control means are arranged to execute the method presented above.

According to an embodiment of the present invention, the arrangement comprises means for protecting the NOx measurement means from the exhaust gas between the measurements.

According to another embodiment of the present invention, the arrangement comprises a by-pass duct being arranged downstream from the catalyst element and the means for measuring NOx concentration are arranged in the by-pass duct.

According to another embodiment of the present invention, the arrangement comprises means for introducing clean gas into the by-pass duct.

According to another embodiment of the present invention, the arrangement comprises an oxidation catalyst being arranged downstream from the catalyst element.

DETAILED DESCRIPTION OF THE INVENTION

Figure 1:
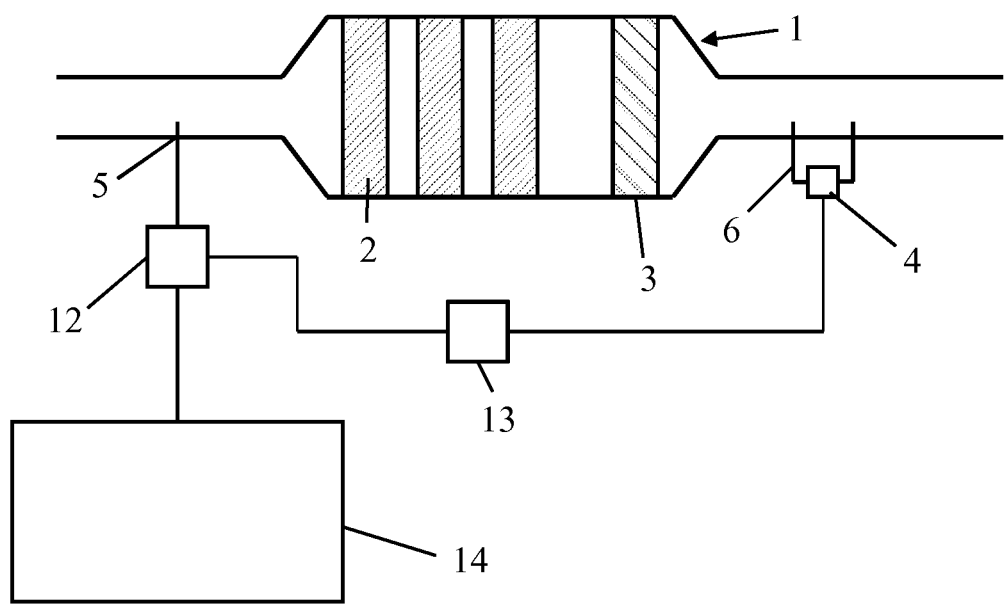
FIG. 1 shows schematically a simplified illustration of an SCR system.

The invention is now described in more detail with reference to the accompanying drawings. In FIG. 1 is shown a simplified illustration of an SCR system for an internal combustion engine. The system comprises a catalytic converter 1 having three SCR elements 2. The SCR elements 2 are ceramic honeycomb structures that are coated with a catalyst material. Urea, which is used as the reducing agent, is injected into the exhaust gas flow upstream from the catalytic converter 1 through a reducing agent injector 5. The urea is stored in a tank 14 and dosing unit 12 ensures that the correct amount of urea solution is injected into the exhaust system. A control unit 13 is arranged to control the dosing unit 12. The urea injected into the exhaust system mixes with the exhaust gas and breaks up into ammonia and carbon dioxide due to the heat of the exhaust gas. On the surface of the SCR elements 2, ammonia molecules react with NOx and form nitrogen and water. Inside the catalytic converter 1, downstream from the SCR elements 2 there is arranged an oxidation catalyst 3. The purpose of the oxidation catalyst 3 is to oxidize carbon monoxide and unburned hydrocarbons. Also at least part of the excess ammonia oxidizes forming mainly nitrogen oxides and water.

Figure 3:
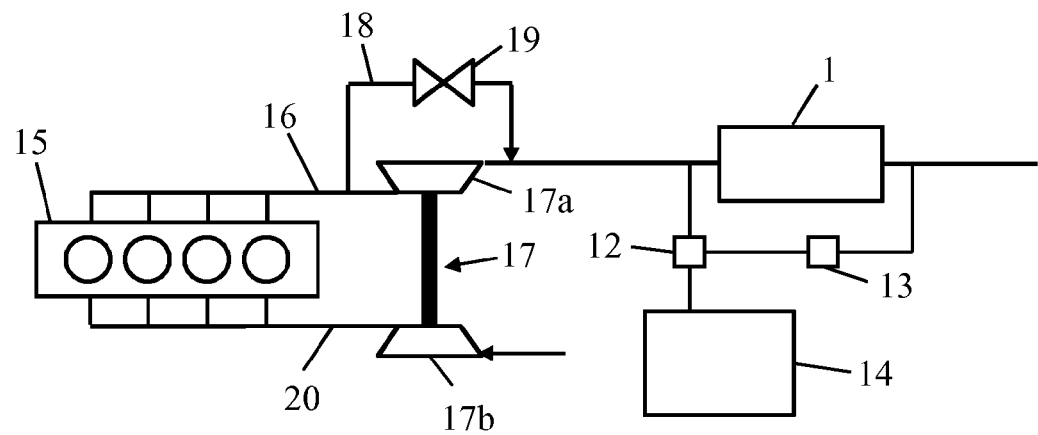
FIG. 3 shows schematically a simplified illustration of an internal combustion engine with an SCR system.
Figure 4:
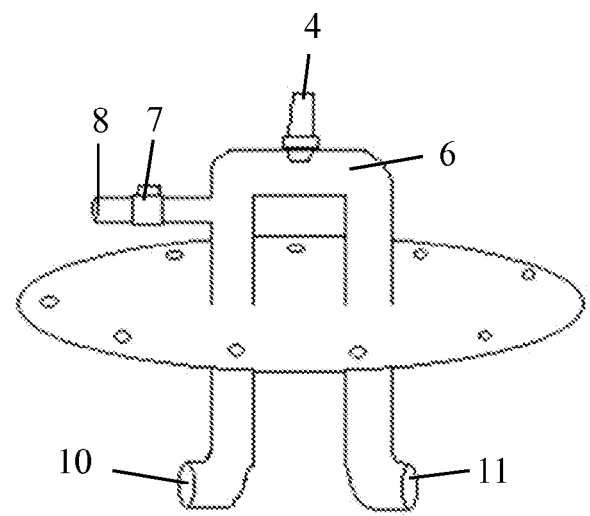
FIG. 4 shows a NOx measuring arrangement.

In FIG. 3, the SCR system is shown in connection with an internal combustion engine 15. The exhaust gas duct 16 of the engine 15 is connected to the turbine 17a of a turbo-charger 17. The exhaust gas duct 16 is provided with a wastegate duct 18 so that part of the exhaust gases can be guided past the turbine 17a when needed. The wastegate duct 18 is provided with a wastegate valve 19 for regulating the exhaust gas flow into the wastegate duct 18.

Figure 2:
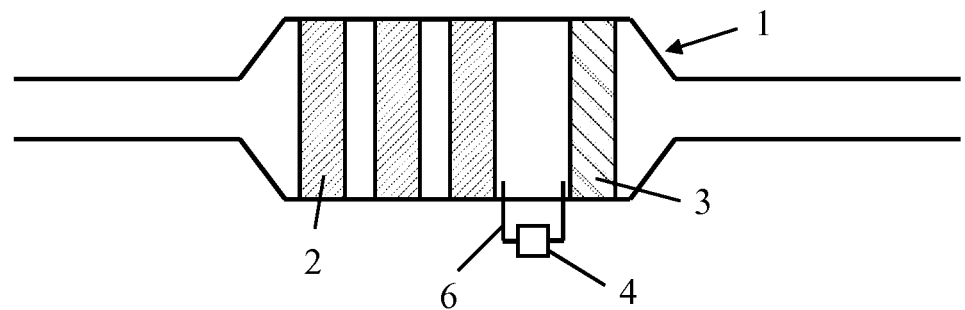
FIG. 2 shows an alternative location for a NOx sensor.

To monitor the NOx concentration of the exhaust gas after the selective catalytic reduction, a NOx sensor 4 has been arranged downstream from the catalytic converter 1. Since NOx sensors are usually cross-sensitive to ammonia, it is also possible to locate the sensor 4 between the SCR elements 2 and the oxidation catalyst 3, as shown in FIG. 2. The NOx sensor 4 is located in a by-pass duct 6. An air duct 7 is connected to the by-pass duct 6. Through the air duct 7, pressurized air can be introduced into the by-pass duct 6. The air duct 7 is equipped with a solenoid valve 8. When the NOx concentration of the exhaust gas is not measured, air is introduced into the by-pass duct 6 at a pressure that is higher than the pressure of the exhaust gas at the measurement point. The NOx sensor 4 is thus protected from the heat and impurities of the exhaust gas. The air can be for instance instrument air, or alternatively charge air from the air intake duct 20 of the engine 15 downstream from the compressor 17b of the turbocharger 17. It is also possible to arrange a separate source of pressurized gas for supplying the by-pass duct 6 with pressurized air or some other clean gas. The control unit 13 controls the NOx sensor 4 and the solenoid valve 8.

A set of trigger events is determined 101, and NOx measurement is started only when at least one of the trigger events is detected. Trigger events are such events that are known to affect NOx formation. Trigger events can include changes in ambient conditions, such as in the ambient temperature and humidity. Another group of trigger events include changes in the engine operating parameters, such as fuel injection timing and duration. Changes in ignition timing could also trigger a NOx measurement. Changes in the operation of a turbocharging system, such as wastegate position or charge air temperature and pressure can also be defined as trigger events. Changes in engine load and speed are also possible choices for trigger events. Finally, it is possible that the elapse of a predetermined amount of time from the previous measurement or starting of the engine could trigger a NOx measurement. To prevent continuous measurements, the trigger events are determined so that only a change of a certain order of magnitude starts a measurement. The trigger events are typically such parameters that are monitored for other control purposes than reducing agent dosing. The need for new instrumentation is thus minimal.

Before NOx measurement, a set point for NOx concentration is determined 102. The set point equals the desired NOx emission level at the measurement point, and can be based for instance on requirements set by legislation or other regulations. A certain margin can be left between the limit for NOx emissions and the set point. For instance, the set point can be a certain percentage lower than the emission limit set by regulations. The set point can be different for different engine loads and/or speeds. The trigger events and the set point can be predetermined and stored in the memory of the control unit 13.

Figure 5:
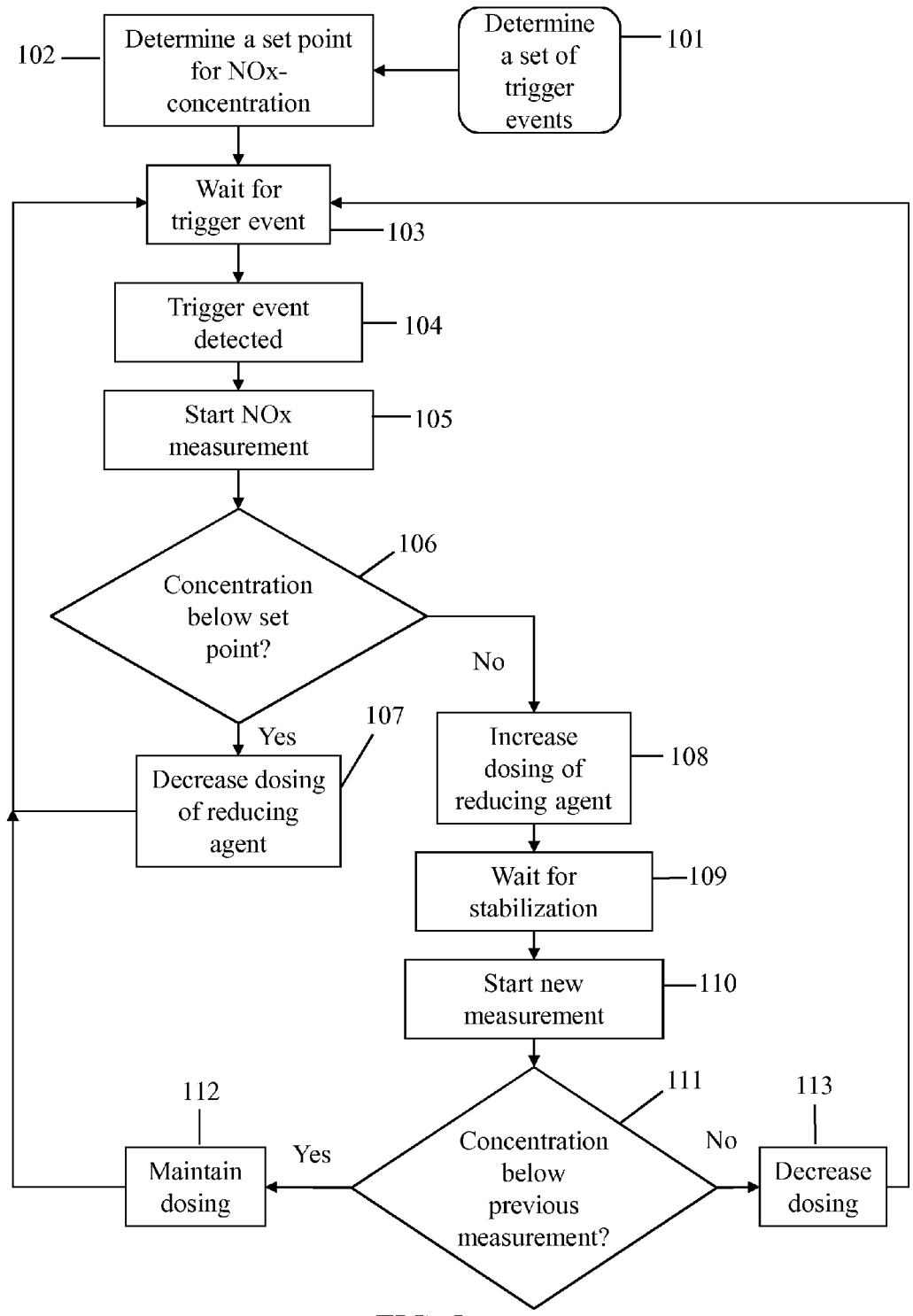
FIG. 5 shows as a flowchart the method according to the present invention.

The measurement sequence is now described with reference to the flowchart shown in FIG. 5. When a trigger event is detected 104, the solenoid valve 8 in the air duct 7 is closed and air flow into the by-pass duct 6 is thus prevented. Due to the speed of the exhaust gas, a pressure difference is formed between the inlet 10 and outlet 11 of the by-pass duct 6 and exhaust gas starts to flow through the by-pass duct 6 and past the NOx sensor 4. The mean value of NOx concentration over a predetermined period of time is measured 105, and the value is stored in a memory. The measured NOx concentration value is compared to a NOx concentration set point 106. If the measured NOx concentration is below the set point, the urea dosing is reduced with an amount dependent on the deviation from the set point 107. The system then goes to a sleeping mode and waits for a new trigger event 103.

If the measured NOx concentration is above the set point, dosing of the urea is increased 108. The increase is dependent on the deviation of the measured concentration from the set point. After increasing the dosing, a predetermined amount of time is waited for the stabilization of the system 109. After that time has elapsed, a new NOx measurement is started 110. If the new measurement shows that the NOx concentration has decreased, the new dosing is maintained 112, and the measurement system goes to the sleeping mode and waits for a new trigger event 103. If the measurement shows that the NOx concentration has increased, it is an indication of urea overdosing. Part of the excess ammonia is oxidized in the oxidation catalyst 3 and NOx concentration downstream from the catalytic converter 1 is thus increased. When overdosing is detected, urea dosing is decreased 113, after which the measurement system goes to the sleeping mode and waits for a new trigger event 103. Part of the ammonia goes through the catalytic converter 1 without reacting. Since the NOx sensor 4 is cross-sensitive to ammonia, also the ammonia slip is detected by the sensor 4. Due to the cross-sensitivity, the NOx sensor 4 could also be located between the catalyst elements 2 and the oxidation catalyst 3.

The invention claimed is:

1. A method for controlling a selective catalytic reduction system, the catalytic reduction system being for an internal combustion engine, which method exploits a predetermined set of trigger events and a predetermined set point for NOx concentration downstream from a catalyst element, the method comprising the steps of:
   a) waiting for a trigger event,
   b) at the occurrence of a trigger event, starting a NOx concentration measurement downstream from the catalyst element,
   c) determining the difference between the measured concentration and the set point,
   d) in the event of the difference being negative, decreasing the dosing of the reducing agent with an amount dependent on the difference and moving back to the first step,
   e) in the event of the difference being positive, increasing the dosing of the reducing agent with an amount dependent on the difference,
   f) waiting a predetermined amount of time for the stabilization of the system,
   g) starting a new NOx concentration measurement and comparing the NOx concentration to the result of the previous measurement,
   h) in the event of the measured value being below the previous measured value, maintaining the same dosing of the reducing agent and moving back to the first step, and
   i) in the event of the measured value being above the previous measured value, decreasing the dosing of the reducing agent with an amount greater than the increase after the previous measurement and moving back to the first step.

2. The method according to claim 1, wherein the NOx concentration is measured from a by-pass duct.

3. The method according to claim 2, wherein clean gas is introduced into the by-pass duct between the measurements.

4. The method according to claim 1, wherein the NOx concentration is measured downstream from an oxidation catalyst.

5. A The method according to claim 1, wherein the trigger events include changes in at least one of the following parameters:
   waste gate position,
   ambient temperature,
   ambient humidity,
   charge air temperature,
   charge air pressure,
   engine load,
   engine speed,
   charge air cooling water temperature,
   fuel injection timing,
   fuel injection duration, and
   ignition timing.

6. The method according to claim 1, wherein the trigger events include elapse of a predetermined amount of time from the previous measurement or starting of the engine.

7. An arrangement for selective catalytic reduction, the arrangement comprising:
   at least one catalyst element,
   means for introducing reducing agent into the exhaust system upstream from the catalyst element,
   means for measuring NOx concentration downstream from the catalyst element, and
   control means for controlling the NOx measuring means and the dosing of the reducing agent,
   wherein the control means are arranged to execute the method according to claim 1.

8. The arrangement according to claim 7, wherein the arrangement comprises means for protecting the NOx measurement means from the exhaust gas between the measurements.

9. The arrangement according to claim 8, wherein the arrangement comprises a by-pass duct being arranged downstream from the catalyst element and that the means for measuring NOx concentration are arranged in the by-pass duct.

10. The arrangement according to claim 9, wherein the arrangement comprises means for introducing clean gas into the by-pass duct.

11. The arrangement according to claim 7, wherein the arrangement comprises an oxidation catalyst being arranged downstream from the catalyst element.

* * * * *